(12) United States Patent
Oyama et al.

(10) Patent No.: US 10,209,096 B2
(45) Date of Patent: Feb. 19, 2019

(54) ROTATION DETECTING DEVICE

(71) Applicant: HIROSE ELECTRIC CO., LTD., Tokyo (JP)

(72) Inventors: Shoji Oyama, Tokyo (JP); Atsushi Kasuga, Tokyo (JP)

(73) Assignee: HIROSE ELECTRIC CO., LTD., Tokyo (JP)

( * ) Notice: Subject to any disclaimer, the term of this patent is extended or adjusted under 35 U.S.C. 154(b) by 317 days.

(21) Appl. No.: 15/285,711

(22) Filed: Oct. 5, 2016

(65) Prior Publication Data

US 2017/0122781 A1 May 4, 2017

(30) Foreign Application Priority Data

Oct. 30, 2015 (JP) .................... 2015-214436

(51) Int. Cl.
| | | |
|---|---|---|
| G01D 5/14 | (2006.01) | |
| G01P 3/487 | (2006.01) | |
| G01D 5/20 | (2006.01) | |
| H02P 6/16 | (2016.01) | |

(52) U.S. Cl.
CPC ............ G01D 5/145 (2013.01); G01D 5/2033 (2013.01); G01P 3/487 (2013.01); H02P 6/16 (2013.01)

(58) Field of Classification Search
CPC .... G01P 3/44; G01P 3/487; H02P 6/16; H02P 6/17; H02K 29/06; H02K 29/08; H02K 29/14; G01D 5/142; G01D 5/145; G01D 5/147; G01D 5/2033; G01R 3/0052
See application file for complete search history.

(56) References Cited

U.S. PATENT DOCUMENTS

| | | | | |
|---|---|---|---|---|
| 6,476,600 B2* | 11/2002 | Kono | ..................... | G01D 5/145 324/207.2 |
| 2003/0020468 A1* | 1/2003 | Kato | ....................... | G01D 3/02 324/207.25 |
| 2011/0301913 A1* | 12/2011 | Matsumoto | ........... | G01D 5/145 702/151 |

FOREIGN PATENT DOCUMENTS

JP          2001-194182 A         7/2001

* cited by examiner

*Primary Examiner* — Son Le
*Assistant Examiner* — Dustin Dickinson
(74) *Attorney, Agent, or Firm* — Kubotera & Associates, LLC

(57) ABSTRACT

A rotation detecting device includes a plurality of magnetic field generating portions; a magnetic member; a coil wound around the magnetic member; and a magnetic field introducing portion. The magnetic field introducing portion introduces a magnetic flux generated by the magnetic field generating portion to pass through the magnetic member when the magnetic field generating portion passes through a specific location.

9 Claims, 12 Drawing Sheets

US 10,209,096 B2

ROTATION DETECTING DEVICE

BACKGROUND TECHNOLOGY AND RELATED TECHNOLOGY

The present invention relates to a rotation detecting device for detecting a rotation of a detection subject using a magnetic force.

Patent Reference 1 has disclosed a conventional rotation detecting device. FIG. 13 is a schematic perspective view showing the conventional rotation detecting device 101 disclosed in Patent Reference.

Patent Reference: Japanese Patent Publication No. 2001-194182

As shown in FIG. 13, the conventional rotation detecting device 101 includes a plurality of magnets 102 and a detection element 103. Each of the magnets 102 is fixed on an outer circumference portion of a rotational member 104 having a cylindrical shape. Further, each of the magnets 102 is formed of a permanent magnet, and is magnetized in a direction in parallel to a rotational axis 105 of the rotational member 104. Further, the magnets 102 are arranged along an outer circumference direction of the rotational member 104 such that magnetized directions thereof become opposite alternately.

In the conventional rotation detecting device 101, the detection element 103 is disposed near the outer circumference portion of a rotational member 104. Further, the detection element 103 is formed of a magnetic element 106 having a wire shape and capable of generating a large Barkhausen effect. A coil 107 is wound around the magnetic element 106.

In the conventional rotation detecting device 101, the magnetic element 106 extends in a direction in parallel to the rotational axis 105 of the rotational member 104. Further, the magnetic element 106 is magnetized in a magnetization direction in parallel to the rotational axis 105 of the rotational member 104, and the magnetization direction is reversed when an external magnetic field is applied.

In the conventional rotation detecting device 101 disclosed in Patent Reference, the rotational member 104 is rotated together with the magnates 102, and the detection element 103 is stationary at one location. Accordingly, when the rational member 104 is rotated, the magnets 102 sequentially pass through near the detection element 103, so that an alternate magnetic field is applied to the wire-shaped magnetic element 16. During this process, every time when one of the magnets 102 gets close to the detection element 103, the magnetization direction of the detection element 103 is reversed due to the magnetic field generated by the one of the magnets 102. As a result, the coil 107 generates a pulse signal.

In the conventional rotation detecting device 101 disclosed in Patent Reference, when a radius of the rotational member 104 is decreased so that a size of the conventional rotation detecting device 101 is reduced, an outer circumference of the rotational member 104 is decreased. As a result, an interval of the magnets 102 disposed along the outer circumference portion of the rotational member 104 is also decreased.

Further, in the conventional rotation detecting device 101, when the number of the magnets 102 is increased, the number of the pulses per rotation is increased. Accordingly, it is possible to improve detection accuracy of the conventional rotation detecting device 101. However, when the number of the magnets 102 is increased, the interval of the magnets 102 disposed along the outer circumference portion of the rotational member 104 is decreased.

Further, in the conventional rotation detecting device 101, when one of the magnets 12 approaches the detection element 103, a magnetic flux of the one of the magnets 12 is considered to pass through paths P51, P52, and P53 as shown in FIG. 13. The path P51 passes from an N pole of the one of the magnets 12 to an S pole of the one of the magnets 12 through the magnetic element 106 in a direction in parallel to the rotational axis 105. The path P52 passes from the N pole of the one of the magnets 12 to an S pole of another one of the magnets 12 situated adjacent to the one of the magnets 12. The path P53 passes from an N pole of another one of the magnets 12 situated adjacent to the one of the magnets 12 to the S pole of the one of the magnets 12.

As described above, in the conventional rotation detecting device 101, when the interval of the magnets 102 disposed along the outer circumference portion of the rotational member 104 is decreased, the N poles and the S poles of the two adjacent ones of the magnets 102 get close to each other. Accordingly, the magnetic flux tends to concentrate in the paths P52 and P53 that do not pass through the magnetic element 106, and the magnetic flux tends not to concentrate in the path P51 that passes through the magnetic element 106.

As a result, even when the magnets 102 sufficiently get close to the detection element 103, the magnetization direction of the magnet element 106 may not be reversed, thereby causing malfunction in which the coil 107 fails to generate the pulse. If the coil 107 does not properly generate the pulse, it is difficult for the conventional rotation detecting device 101 to detect accurately the rotation of the rotational member 104. In other words, it is difficult for the conventional rotation detecting device 101 to improve the rotation detection accuracy, as well as to reduce the size thereof.

In view of the problems of the conventional rotation detecting device described above, an object of the invention is to provide a rotation detecting device capable of solving the problems. According to the rotation detecting device of the present invention, it is possible to improve the detection accuracy of the rotation detecting device, as well as to reduce the size thereof.

Further objects and advantages of the invention will be apparent from the following description of the invention.

SUMMARY OF THE INVENTION

In order to attain the objects described above, according to a first aspect of the present invention, a rotation detecting device is configured to detect a rotation of a rotational member that is rotated relative to a base member.

According to the first aspect of the present invention, the rotation detecting device includes a plurality of magnetic field generating portions attached to the rotational member. The magnetic field generating portions are magnetized in a direction perpendicular to a rotational axis of the rotational member. Further, the magnetic field generating portions are arranged along a circumferential direction of the rotational member such that magnetization directions of the magnetic field generating portions become alternately opposite.

According to the first aspect of the present invention, the rotation detecting device further includes a magnetic member attached to the base member and arranged within a rotational path of the magnetic field generating portions. The magnetic member extends in a direction in parallel to the rotational axis of the rotational member, and a magnetization direction of the magnetic member is in parallel to the rotational axis of the rotational member. Further, the magnetization direction of the magnetic member is reversed by a magnetic field generated by a part of the magnetic field generating portions among the magnetic field generating portions. Further, the rotation detecting device includes a coil wound around the magnetic member.

According to the first aspect of the present invention, the rotation detecting device further includes a magnetic field introducing portion attached to the base member and arranged between the rotational path and the magnetic member. The magnetic field introducing portion is arranged to introduce a magnetic flux generated by the part of the magnetic field generating portions to pass through the magnetic member in a direction in parallel to the rotational axis of the rotational member when the part of the magnetic field generating portions among the magnetic field generating portions passes through a specific location on the rotational path thereof.

As described above, according to the first aspect of the present invention, the magnetic field introducing portion is arranged to introduce the magnetic flux generated by the part of the magnetic field generating portions to pass through the magnetic member in the extending direction thereof when the part of the magnetic field generating portions among the magnetic field generating portions passes through the specific location (is situated at the specific location). Accordingly, when the magnetization direction of the magnet member is opposite to the direction of the magnetic flux, the magnetization direction of the magnet member is reversed so that the magnetization direction of the magnet member is aligned with the direction of the magnetic flux.

According to the first aspect of the present invention, the magnetic field generating portions are magnetized in the direction perpendicular to the rotational axis of the rotational member. Further, the magnetic field introducing portion is arranged to introduce the magnetic flux generated by the part of the magnetic field generating portions to pass through the magnetic member in the extending direction thereof when the part of the magnetic field generating portions passes through the specific location.

Accordingly, even when the magnetic field generating portions (for example, magnets) attached to the rotational member are arranged with a small interval along the circumferential direction of the rotational member, it is possible to concentrate the magnetic flux generated by the part of the magnetic field generating portions to pass through the magnetic member in the extending direction thereof when the part of the magnetic field generating portions passes through the specific location. As a result, it is possible to securely reverse the magnetization direction of the magnet member. Accordingly, it is possible to reduce a size of the rotation detecting device, and to improve accuracy of rotation detection of the rotation detecting device.

According to a second aspect of the present invention, in the rotation detecting device in the first aspect, the magnetic field introducing portion may be arranged to introduce the magnetic flux passing from one of the magnetic field generating portions having the opposite magnetization directions to the other of the magnetic field generating portions to pass through the magnetic member in the direction in parallel to the rotational axis of the rotational member when the one of the magnetic field generating portions passes through a first location on the rotational path thereof and the other one of the magnetic field generating portions concurrently passes through a second location on the rotational path thereof.

According to the second aspect of the present invention, the magnetic field introducing portion introduces the magnetic flux such that the magnetic flux passes from one of two magnetic field generating portions having the opposite magnetization directions through the magnetic member in the extending direction thereof to the other of the magnetic field generating portions. Accordingly, the magnetic flux has a simple shape and a short path length. As a result, it is possible to form the magnetic field introducing portion for introducing the magnetic flux in such a path in a simple shape. Further, it is possible to easily concentrate the magnetic flux to pass through the magnetic member in the extending direction thereof. Still further, it is possible to concentrate the magnetic flux to a significantly greater extent, and increase a magnetic flux concentration of the magnetic flux.

According to a third aspect of the present invention, in the rotation detecting device in the first aspect or the second aspect, the magnetic field introducing portion may include a pair of yoke pieces. The yoke pieces are arranged to face each other and be away from each other with a distance in between in a direction in parallel to the rotational axis of the rotational member.

According to the third aspect of the present invention, each of the yoke pieces includes a protruding portion protruding toward the rotational path of the magnetic field generating portions. Further, the yoke pieces are arranged such that one of the magnetic field generating portions having the magnetization directions opposite to each other gets close to the protruding portion of one of the yoke pieces when the other of the magnetic field generating portions gets close to the protruding portion of the other of the yoke pieces.

According to the third aspect of the present invention, the yoke pieces are arranged such that one of the magnetic field generating portions gets close to the protruding portion of one of the yoke pieces when the other of the magnetic field generating portions gets close to the protruding portion of the other of the yoke pieces. Accordingly, it is possible to generate a path of the magnetic flux passing from the other of the magnetic field generating portions to the one of the magnetic field generating portions through the magnetic member.

According to the third aspect of the present invention, the yoke piece includes the protruding portion protruding from the yoke piece toward the rotational path of the magnetic field generating portions. Accordingly, it is possible to concentrate the magnetic flux to the rotational path. Further, the yoke pieces are arranged to face each other and be away from each other with a distance in between in the extending direction of the magnetic member. Accordingly, it is possible to concentrate the magnetic flux passing from the one of the magnetic field generating portions to the other of the magnetic field generating portions such that the magnetic flux passes the magnetic member in the extending direction thereof.

According to a fourth aspect of the present invention, in the rotation detecting device in one of the first aspect to the third aspect, one of the yoke pieces may be situated at a location corresponding to one end portion of the magnetic member, and the other of the yoke pieces may be situated at a location corresponding to the other end portion of the magnetic member.

According to the fourth aspect of the present invention, with the configuration described above, it is possible to pass the magnetic flux passing from one of the yoke pieces to the other of the yoke pieces to pass from the one end portion of the magnetic member to the other end portion thereof in the extending direction thereof.

According to a fifth aspect of the present invention, in the rotation detecting device in one of the first aspect to the fourth aspect, each of the yoke pieces may be formed of a plate member. The plate member may be curved so that the plate member is situated along an outer circumference of the coil disposed around the magnetic member.

According to the fifth aspect of the present invention, with the configuration described above, it is possible to increase an area of each of the yoke pieces approaching the magnetic member. Accordingly, it is possible to increase a magnetic flux density of the magnetic flux passing from one of the yoke pieces to the other of the yoke pieces through the magnetic member in the extending direction thereof.

According to a sixth aspect of the present invention, in the rotation detecting device in one of the first aspect to the fifth aspect, each of the yoke pieces may be formed of a plate member. The plate member may be extended from a portion of the magnetic member where the coil is disposed to a portion of the magnetic member where the coil is not disposed, and then the plate member may be curved. Further, the plate member is extended so that the plate member approaches the magnetic member.

According to the sixth aspect of the present invention, with the configuration described above, it is possible to further increase the magnetic flux density of the magnetic flux passing through the magnetic member. Accordingly, it is possible to securely reverse the magnetization direction of the magnetic member.

According to a seventh aspect of the present invention, in the rotation detecting device in one of the first aspect to the sixth aspect, the magnetic field introducing portion may be arranged to introduce the magnetic flux passing from one surface of the magnetic field generating portion to the other surface of the magnetic field generating portion in a radius direction of the rotational member, so that the magnetic flux passes through the magnetic member in the direction in parallel to the rotational axis of the rotational member when one of the magnetic field generating portions among the magnetic field generating portions passes through a specific location on the rotational path thereof.

According to the seventh aspect of the present invention, with the configuration described above, it is possible to concentrate the magnetic flux generated by one of the magnetic field generating portion passing through the specific location to pass through the magnetic member in the extending direction thereof.

According to an eighth aspect of the present invention, in the rotation detecting device in one of the first aspect to the seventh aspect, the magnetic field generating portions may include a first magnetic field generating portion and a second magnetic field generating portion arranged in a direction in parallel to the rotational axis of the rotational member. The first magnetic field generating portion and the second magnetic field generating portion are magnetized in a direction perpendicular to the rotational axis of the rotational member, so that magnetization directions of the first magnetic field generating portion and the second magnetic field generating portion become opposite to each other.

According to the eighth aspect of the present invention, the first magnetic field generating portions may be arranged in the circumferential direction of the rotational member, so that the magnetization directions of the first magnetic field generating portions become alternately opposite to each other. Further, the second magnetic field generating portions may be arranged in the circumferential direction of the rotational member, so that the magnetization directions of the second magnetic field generating portions become alternately opposite to each other.

According to the eighth aspect of the present invention, the magnetic field introducing portion may be arranged to introduce the magnetic flux passing from one of the first magnetic field generating portion and the second magnetic field generating portion to the other of the first magnetic field generating portion and the second magnetic field generating portion, so that the magnetic flux passes through the magnetic member in the direction in parallel to the rotational axis of the rotational member when one of the magnetic field generating portions among the magnetic field generating portions passes through a specific location on the rotational path thereof.

According to the eighth aspect of the present invention, with the configuration described above, it is possible to concentrate the magnetic flux generated by one of the magnetic field generating portion passing through the specific location to pass through the magnetic member in the extending direction thereof.

According to the present invention, due to the large Barkhausen effect, the magnetization direction of the magnetic member is instantly reversed every time when the magnetic field generating portions having the different magnetization directions pass through the specific location, so that the coil outputs the pulse.

DETAILED DESCRIPTION OF THE PREFERRED EMBODIMENTS

Hereunder, referring to the accompanying drawings, preferred embodiments of the present invention will be described.

First Embodiment

Figure 1:
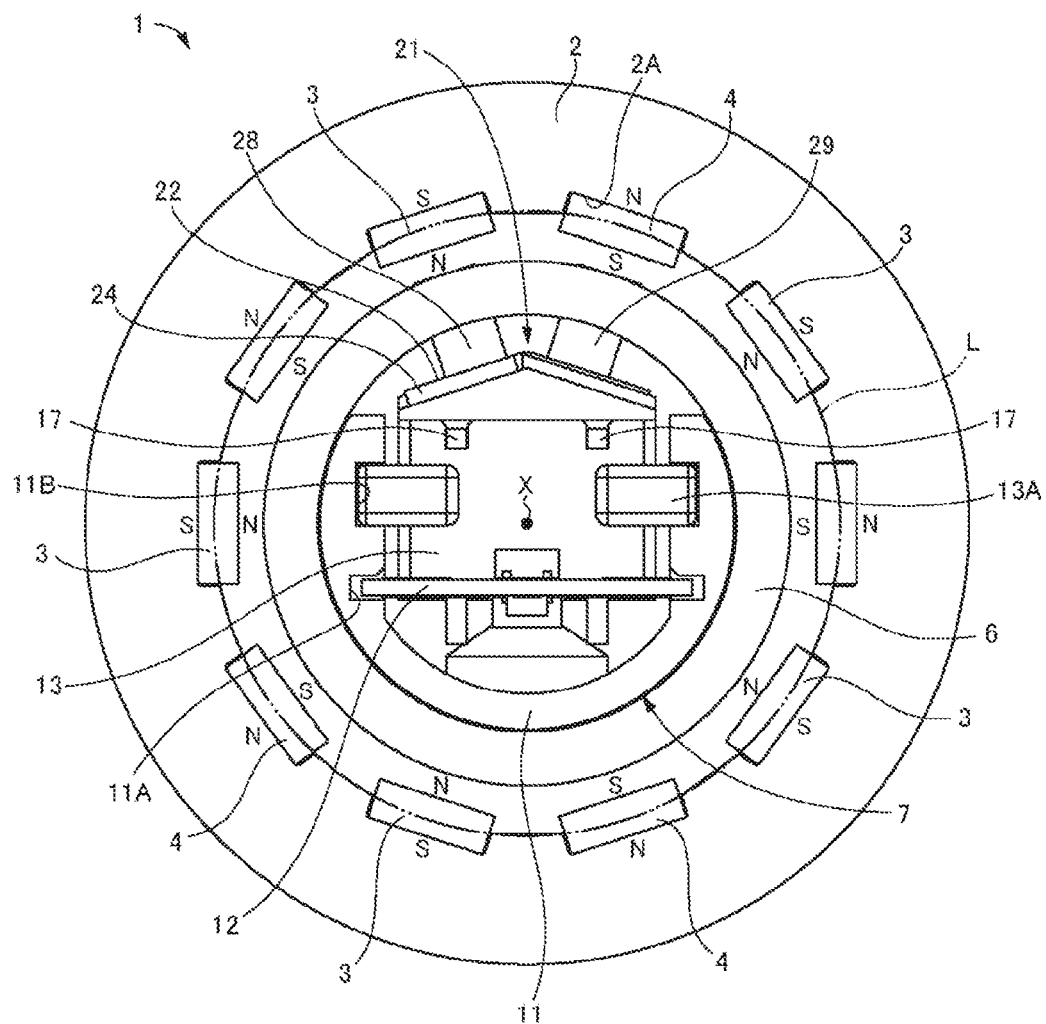
FIG. 1 is a schematic plan view showing a configuration of a rotation detecting device according to a first embodiment of the present invention.
Figure 2:
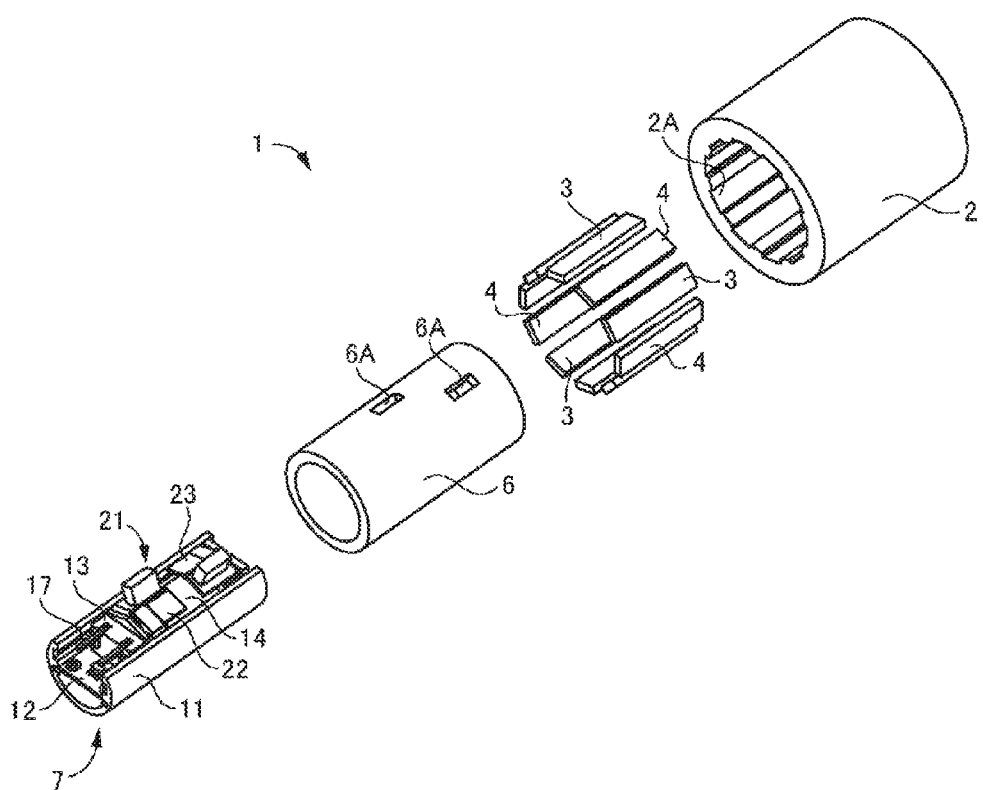
FIG. 2 is a schematic exploded perspective view showing the configuration of the rotation detecting device according to the first embodiment of the present invention.

A first embodiment of the present invention will be explained. FIG. 1 is a schematic plan view showing a configuration of a rotation detecting device 1 according to the first embodiment of the present invention. FIG. 2 is a schematic exploded perspective view showing the configuration of the rotation detecting device 1 according to the first embodiment of the present invention.

As shown in FIGS. 1 and 2, the rotation detecting device 1 includes a cylindrical member (a base member) 6 and a rotational member 2 with a cylindrical shape. The rotational member 2 is inserted into the cylindrical member 6, so that the rotational member 2 is rotated around a rotational axis X thereof relative to the cylindrical member 6. A plurality of magnets 3 and a plurality of magnets 4 as magnetic field generating portions are fixed to the rotational member 2. A detection unit 7 is fixed in the cylindrical member 6, and includes a detection member 14 and a yoke 21 as a magnetic field introducing member (refer to FIG. 4). The detection member 14 includes a magnetic member 15 and a coil 16.

In the first embodiment, when the rotational member 2 is rotated relative to the cylindrical member 6, the magnets 3 and the magnets 4 are rotated relative to a circumference of the detection member 14 and the yoke 21. As a result, magnetic fields of the magnets 3 and the magnets 4 that are applied to the magnetic member 15 are changed, so that a magnetization direction of the magnetic member 15 is reversed. Accordingly, the coil 16 outputs a pulse.

In the first embodiment, when the rotation detecting device 1 is used to detect a rotation of a detection object, which has a non-rotating portion and a rotating portion to be rotated relative to the non-rotating portion, the cylindrical member 6 is fixed to the non-rotating portion and the rotational member 2 is fixed to the rotating portion. Accordingly, the rotation detecting device 1 detects a rotation of the rotational member 2 relative to the cylindrical member 6.

Alternatively, the cylindrical member 6 may be fixed to the rotating portion and the rotational member 2 may be fixed to the non-rotating portion. In this case, the rotation detecting device 1 detects a rotation of the cylindrical member 6 relative to the rotational member 2. In the first embodiment, the rotation detecting device 1 is arranged such that the rotation detecting device 1 detects the rotation of the rotational member 2 relative to the cylindrical member 6.

As shown in FIG. 2, the rotational member 2 is formed in the cylindrical shape, and is formed of a soft magnetic material such as iron and the like. A plurality of groove portions 2A is formed in an inner circumferential surface of the rotational member 2, so that the magnets 3 and the magnets 4 are attached to the groove portions 2A.

In the first embodiment, the magnets 3 and the magnets 4 are formed of a permanent magnet, and re formed in a plate shape extending in a direction in parallel to the rotational axis X. As shown in FIG. 1, the magnets 3 and the magnets 4 are magnetized in a direction perpendicular to the rotational axis X. Further, the magnets 3 and the magnets 4 are arranged along a circumferential direction of the rotational member 2 such that magnetization directions thereof become opposite alternately.

More specifically, each of the magnets 3 has an N pole on a surface thereof facing an inner circumference side and an S pole on a surface thereof facing an outer circumference side. Further, each of the magnets 4 has the S pole on a surface thereof facing the inner circumference side and the N pole on a surface thereof facing the outer circumference side.

In the first embodiment, five of the magnets 3 and five of the magnets 4, a total of ten magnets, are arranged along the circumferential direction of the rotational member 2 with an equal interval (an interval of 36 degrees). It should be noted that the number of the magnets 3 needs to be equal to that of the magnets 4. As long as this condition is satisfied, the number of the magnets 3 and the number of the magnets 4 are not limited to any specific number. As described above, the magnets 3 and the magnets 4 are fixed to the groove portions 2A. Accordingly, when the rotational member 2 is rotated, the magnets 3 and the magnets 4 are moved along a rotational path L with a circular shape around the rotational axis X.

Instead of the configuration in the first embodiment, in which the magnets 3 and the magnets 4 are fixed to the rotational member 2, an alternative configuration may be possible. For example, a magnetization process may be applied to a cylindrical shape member formed of a hard magnetic material at a plurality of locations, so that the magnetic field generation portions are formed at the locations.

More specifically, a plurality of magnetic field generation portions may be formed in advance in a cylindrical shape member formed of a hard magnetic material. In this case, the magnetic field generation portions are magnetized in a direction perpendicular to a central axis of the cylindrical shape member, and are arranged along a circumferential direction of the cylindrical shape member such that magnetization directions of the magnetic field generation portions become alternately opposite. Afterward, the cylindrical shape member is attached to the inner circumferential side of the rotational member 2. Further, alternatively, the rotational member 2 itself may be formed of a cylindrical shape member formed of a hard magnetic material having a plurality of magnetic field generation portions.

As shown in FIG. 2, the cylindrical member 6 is formed in a cylindrical shape with the rotational axis X as a central axis thereof, and is formed of a material having a magnetic permeability lower than that of the yoke 21 (described in detail later). Further, the cylindrical member 6 has an outer diameter smaller than an inner diameter of the rotational member 2, so that the cylindrical member 6 is accommodated inside the rotational member 2. Further, the cylindrical member 6 is arranged such that an outer circumferential surface of the cylindrical member 6 is apart from an inner circumferential surface of the rotational member 2. Accordingly, the rotational member 2 is capable of rotating around a circumference of the cylindrical member 6 around the rotational axis X. Further, the cylindrical member 6 includes hole portions 6A penetrating through a circumference portion of the cylindrical member 6 at two locations of the circumference portion of the cylindrical member 6.

Figure 3:
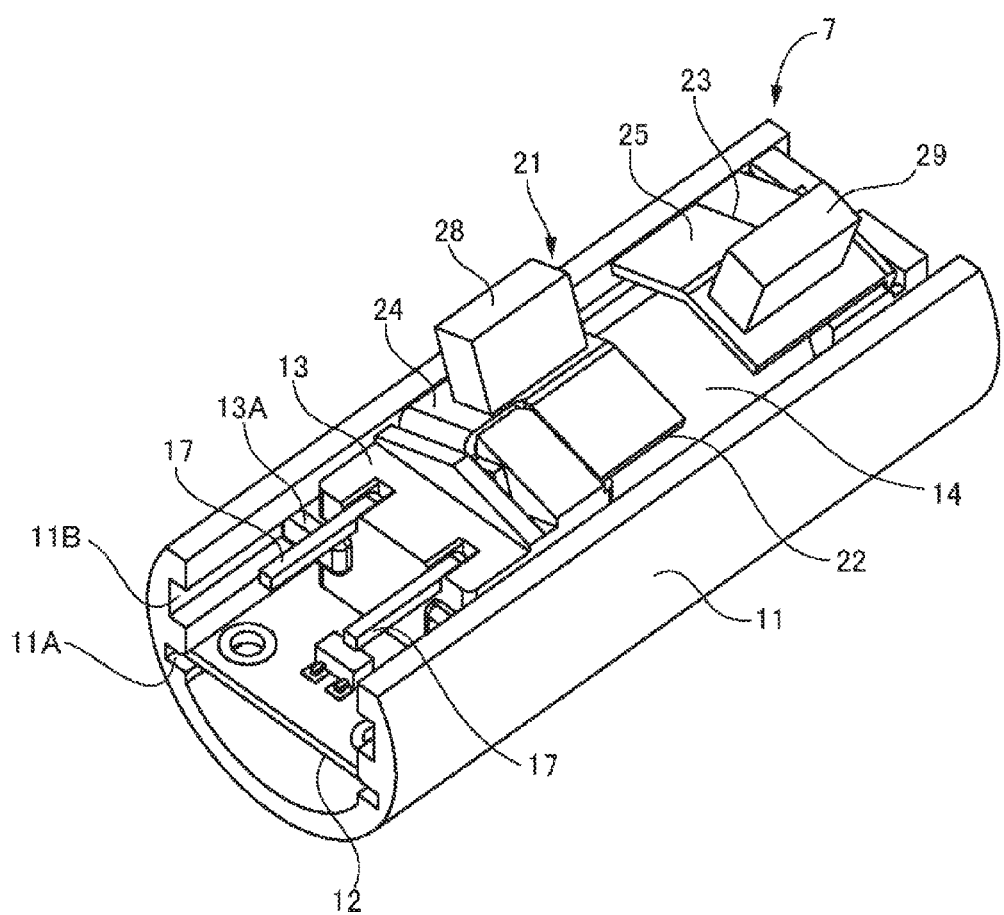
FIG. 3 is a schematic perspective view showing a detection unit of the rotation detecting device according to the first embodiment of the present invention.

FIG. 3 is a schematic perspective view showing the detection unit 7 of the rotation detecting device 1 according to the first embodiment of the present invention.

As shown in FIG. 3, the detection unit 7 includes a supporting member 11. The supporting member 11 is formed of a plastic and the like, and formed in a cylindrical shape with a part of a circumferential portion thereof removed. Further, the detection unit 7 includes a board plate 12 and a housing 13 fixed inside the supporting member 11, so that the detection member 14, the yoke 21, and a pair of terminals 17 are fixed to the housing 13. A board plate supporting groove 11A is formed in an inner surface of the supporting member 11, so that an edge portion of the board plate 12 is engaged with the board plate supporting groove 11A. Further, a housing supporting groove 11B is also formed in the inner surface of the supporting member 11, so that a supporting protruding band portion 13A of the housing 13 is engaged with the housing supporting groove 11B.

Figure 4:
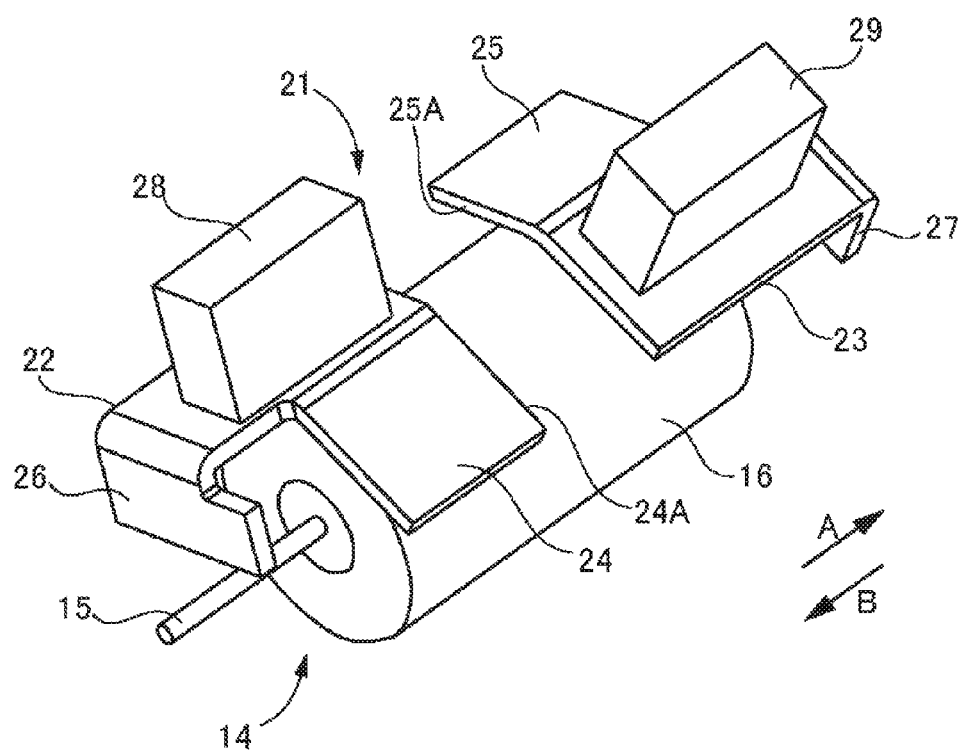
FIG. 4 is a schematic perspective view showing a detection member and a yoke of the detection unit of the rotation detecting device according to the first embodiment of the present invention.
Figure 5:
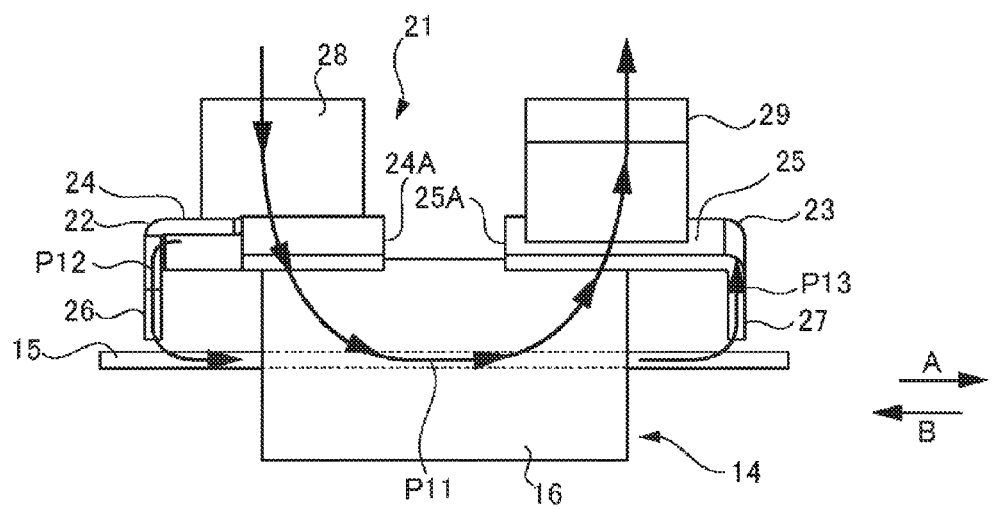
FIG. 5 is a schematic side view showing the detection member and the yoke of the detection unit of the rotation detecting device according to the first embodiment of the present invention.
Figure 6:
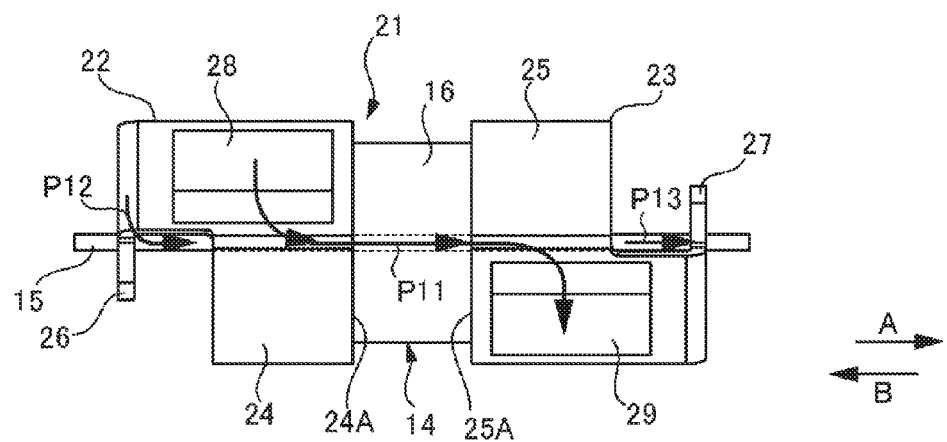
FIG. 6 is a schematic plan view showing the detection member and the yoke of the detection unit of the rotation detecting device according to the first embodiment of the present invention.
Figure 7:
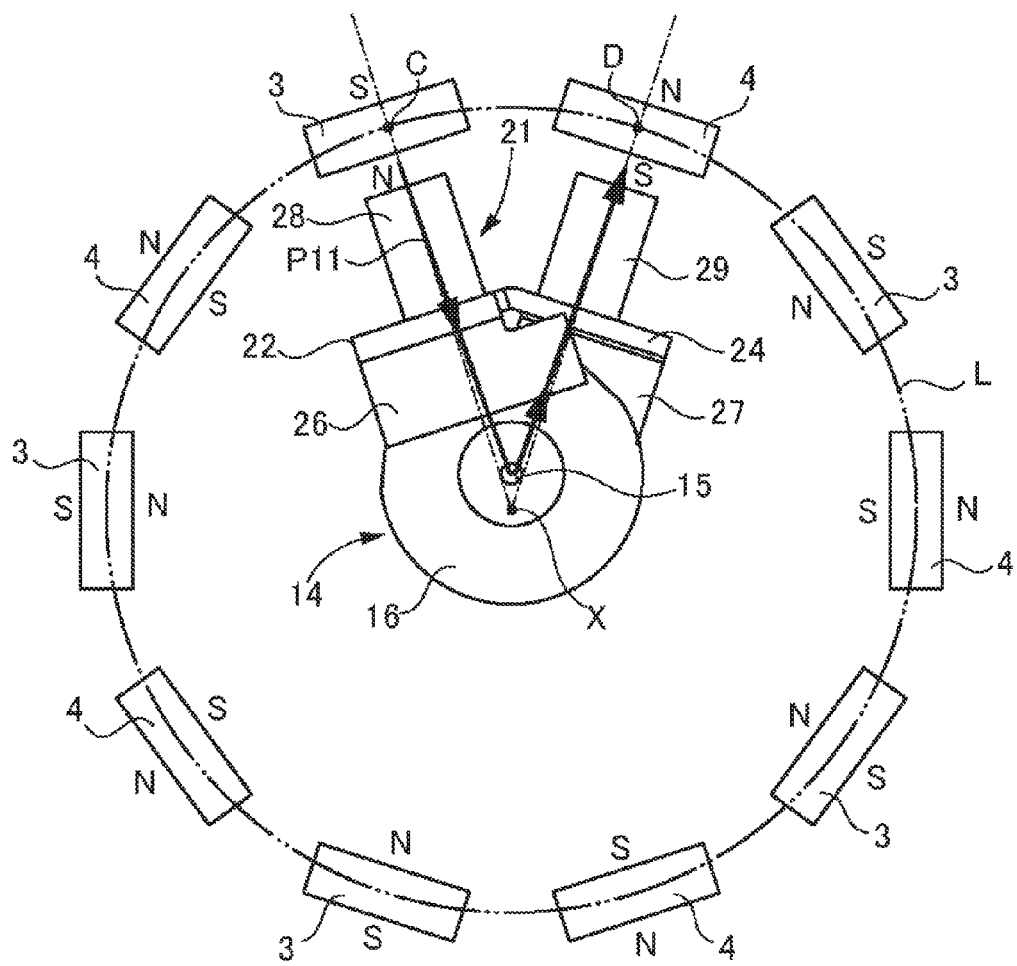
FIG. 7 is a schematic plan view showing a magnet and the detection member of the detection unit of the rotation detecting device according to the first embodiment of the present invention.

FIG. 4 is a schematic perspective view showing the detection member 14 and the yoke 21 of the detection unit 7 of the rotation detecting device 1 according to the first embodiment of the present invention. FIG. 5 is a schematic side view showing the detection member 14 and the yoke 21 of the detection unit 7 of the rotation detecting device 1 according to the first embodiment of the present invention. FIG. 6 is a schematic plan view showing the detection member 14 and the yoke 21 of the detection unit 7 of the rotation detecting device 1 according to the first embodiment of the present invention. FIG. 7 is a schematic plan view showing the magnets 3, the magnets 4, and the detection member 14 of the detection unit 7 of the rotation detecting device 1 according to the first embodiment of the present invention.

As shown in FIG. 3, the detection member 14 is disposed inside the housing 13. The detection member 14 is configured to detect the rotation of the rotational member 2 through the magnetic fields generated by the magnets 3 and the magnets 4. Further, the detection member 14 is situated inside the rotational path L of the magnets 3 and the magnets 4. As shown in FIG. 4, the detection member 14 is formed of a magnetic member 15 and a coil 16 wound around the magnetic member 15.

In the first embodiment, the magnetic member 15 is formed of a material having the large Barkhausen effect. More specifically, the magnetic member 15 may be formed of a composite magnetic member having a wire shape and a mono-axial anisotropy (for example, refer to Patent Reference). The magnetic member 15 extends in a direction in parallel to the rotational axis X of the rotational member 2. It has been known that the composite magnetic member is magnetized in an extending direction thereof. Accordingly, the magnetic member 15 has a magnetization direction in parallel to the rotational axis X of the rotational member 2.

In the first embodiment, when the magnetic field in the extending direction of the magnetic member 15, that is, a direction A in FIG. 4, is applied to the magnetic member 15, the magnetization direction of the magnetic member 15 becomes the direction A. On the other hand, when the magnetic field in the opposite direction of the extending direction of the magnetic member 15, that is, a direction B in FIG. 4, is applied to the magnetic member 15, the magnetization direction of the magnetic member 15 becomes the B direction. It should be noted that the magnets 3, the magnets 4, and the yoke 21 form the magnetic field to be applied to the magnetic member 15 (described in more detail later).

In the first embodiment, when the direction of the magnetic field to be applied to the magnetic member 15 is changed from the direction A to the direction B, or from the B direction to the direction A, the magnetization direction of the magnetic member 15 is reversed. Further, due to the large Barkhausen effect, the magnetization direction of the magnetic member 15 is reversed instantly. Accordingly, an electric current instantly flows through the coil 16 through electromagnetic induction, and the coil 16 outputs the pulse. As a result, it is possible to retrieve the pulse output from the coil 16 through the terminals 17.

In the first embodiment, the housing 13 is provided with the yoke 21. The yoke 21 is disposed between the detection member 14 and the rotational path L of the magnets 3 and the magnets 4. Further, the yoke 21 is configured to introduce the magnetic flux generated by the magnets 3 and the magnets 4 arranged adjacently along the circumferential direction of the rotational member 2, so that the magnetic flux passes through the magnetic member 15 in the extending direction thereof.

In the first embodiment, the yoke 21 includes a pair of yoke pieces 22 and 23. Each of the yoke piece 22 and the yoke piece 23 is formed of a soft magnetic material. Further, the yoke piece 22 and the yoke piece 23 are disposed in a direction in parallel to the rotational axis X of the rotational member 2 with a distance in between.

More specifically, the yoke piece 22 is disposed at a location corresponding to one end portion of the magnetic member 15, and the yoke piece 23 is disposed at a location corresponding to the other end portion of the magnetic member 15. Accordingly, none of the yoke piece 22 and the yoke piece 23 is disposed at a location corresponding to a middle portion of the magnetic member 15 in the extending direction thereof. It should be noted that the yoke piece 22 and the yoke piece 23 are arranged close to the coil 16 wound around the magnetic member 15, but do not contact with the coil 16.

In the first embodiment, the yoke piece 22 includes a base portion 24 formed in a plate shape; a sidewall portion 26 curved at an end portion of the base portion 24; and a protruding portion 28 protruding from the base portion 24. Similar to the yoke piece 22, the yoke piece 23 includes a base portion 25, a sidewall portion 27, and a protruding portion 29, except that locations and orientations are different from those of the yoke piece 22.

In the first embodiment, the base portion 24 of the yoke piece 22 is curved such that the base portion 24 is situated along a most outer circumference of the coil 16 wound around the magnetic member 15. When the base portion 24 is curved in such a shape, it is possible to increase an area of the base portion 24 near the magnetic member 15 among a surface of the base portion 24 facing the magnetic member 15. Similar to the base portion 24, the base portion 25 of the yoke piece 23 is curved to increase an area of the base portion 25 near the magnetic member 15.

As shown in FIG. 6, the base portion 24 of the yoke piece 22 has an edge surface 24A facing the base portion 25 of the yoke piece 23, and the base portion 25 of the yoke piece 23 has an edge surface 25A facing the base portion 24 of the yoke piece 22. Further, the edge surface 24A is arranged to be in parallel to the edge surface 25A.

As shown in FIG. 5, the base portion 24 of the yoke piece 22 extends in a direction in parallel to the extending direction of the magnetic member 15 from a portion of the magnetic member 15 where the coil 16 is wound near the middle portion of the magnetic member 15 in the extending direction thereof to a portion of the magnetic member 15 where the coil 16 is not wound near the end portion of the magnetic member 15. Further, the base portion 24 of the yoke piece 22 is curved toward the magnetic member 15 beyond the portion of the magnetic member 15 where the coil 16 is not wound near the end portion of the magnetic member 15.

Accordingly, beyond the curved portion thereof, the base portion 24 of the yoke piece 22 extends close to the magnetic member 15 in a direction crossing the extending direction of the magnetic member 15 (for example, a direction perpendicular to the extending direction of the magnetic member 15). It should be noted that the sidewall portion 26 corresponds to the portion of the base portion 24 extending close to the magnetic member 15 in the direction crossing the extending direction of the magnetic member 15. A distal end portion of the sidewall portion 26 is closer to the magnetic member 15 than other portion of the yoke piece 22. The sidewall portion 27 of the yoke piece 23 is configured similarly to the sidewall portion 26 of the yoke piece 22.

As shown in FIG. 7, the protruding portion 28 and the protruding portion 29 extend toward the rotational path L of the magnets 3 and the magnets 4 from surfaces of the base portion 24 and the base portion 25 facing the rotational path L, respectively. It should be noted that two magnetic field applying positions C and D are defined on the rotational path L. More specifically, the magnetic field applying positions C and D are defined such that a distance between the magnetic field applying positions C and D is equal to a distance between the magnet 3 and the magnet 4 arranged adjacently along the circumferential direction of the rotational member 2 (36 degrees in the first embodiment).

In the first embodiment, the protruding portion 28 of the yoke piece 22 extends toward the magnetic field applying position C, and the protruding portion 29 of the yoke piece 23 extends toward the magnetic field applying position D. Further, the protruding portion 28 of the yoke piece 22 is arranged such that a distal end portion thereof gets close to (does not contact with) one of the magnet 3 and the magnet 4 when the one of the magnet 3 and the magnet 4 is situated at the magnetic field applying position C. Similarly, the protruding portion 29 of the yoke piece 23 is arranged such that a distal end portion thereof gets close to (does not contact with) one of the magnet 3 and the magnet 4 when the one of the magnet 3 and the magnet 4 is situated at the magnetic field applying position D.

It should be noted that the protruding portion 28 and the protruding portion 29 are accommodated in the hole portions 6A formed in the cylindrical member 6, respectively (refer to FIG. 2). Further, an edge surface of the distal end portion of each of the protruding portion 28 and the protruding portion 29 is exposed on the outer circumferential side of the cylindrical member 6 through the hole portion 6A.

In the first embodiment, the protruding portion 28 is formed of a block member formed of a soft magnetic material, and the base portion 24 is formed of a plate member formed of a soft magnetic material. Further, the protruding portion 28 is joined to or engaged with the base portion 24. Similar to the protruding portion 28, the protruding portion 29 is formed of a block member formed of a soft magnetic material, and is joined to or engaged with the base portion 25.

In the first embodiment, the protruding portion 28 and the protruding portion 29 are formed as a separate member from the base portion 24 and the base portion 25, and are joined to the base portion 24 and the base portion 25. The present invention is not limited to such a configuration. Alternatively, the protruding portion 28 and the protruding portion 29 may be formed through bending a part of the base portion 24 and the base portion 25. Further, the protruding portion 28 and the protruding portion 29 may be formed through integrally molding with the base portion 24 and the base portion 25.

An operation of the rotation detecting device 1 having the configuration described above will be explained next.

When the rotational member 2 is rotated clockwise relative to the cylindrical member 6 in FIG. 7, the magnets 3 and the magnets 4 are rotated clockwise around the circumference of the detection unit 7. When one of the magnets 3 passes through the magnetic field applying position C, one of the magnets 4 situated adjacent to the one of the magnets 3 in clockwise passes through the magnetic field applying position D at the same time. Further, when the one of the magnets 3 passes through the magnetic field applying position C, the one of the magnets 3 approaches the distal end portion of the protruding portion 28 of the yoke piece 22. Still further, when the one of the magnets 4 situated adjacent to the one of the magnets 3 in clockwise passes through the magnetic field applying position D, the one of the magnets 4 approaches the distal end portion of the protruding portion 29 of the yoke piece 23.

When the magnets 3 and the magnets 4 concurrently pass through the protruding portion 28 and the protruding portion 29, the yoke 21 introduces the magnetic flux passing from the magnets 3 to the magnets 4 to pass through the magnetic member 15 in the extending direction thereof. Accordingly, the magnetic field in the direction A generated with the magnets 3 and the magnets 4 is applied to the magnetic member 15. It should be noted that the magnetic field pass through paths P11, P12, and P13 shown in FIGS. 5, 6, and 7. At this moment, when the magnetic member 15 has the magnetization direction in the B direction, the magnetization direction of the magnetic member 15 is reversed, so that the coil 16 outputs the pulse accordingly.

Next, when the rotational member 2 is rotated clockwise by 360 degrees, the one of the magnets 3 moves from the magnetic field applying position C to the magnetic field applying position D, so that the one of the magnets 3 approaches the distal end portion of the protruding portion 29 of the yoke piece 23. At the same time, the one of the magnets 4 situated adjacent to the one of the magnets 3 in clockwise reaches the magnetic field applying position C, so that the one of the magnets 4 approaches the distal end portion of the protruding portion 28 of the yoke piece 22.

When the magnets 3 and the magnets 4 concurrently pass through the protruding portion 28 and the protruding portion 29, the yoke 21 introduces the magnetic flux passing from the magnets 3 to the magnets 4 to pass through the magnetic member 15 in the extending direction thereof. Accordingly, the magnetic field in the direction B generated with the magnets 3 and the magnets 4 is applied to the magnetic member 15. As a result, the magnetization direction of the magnetic member 15 is reversed from the direction A to the direction B, so that the coil 16 outputs the pulse accordingly.

Accordingly, in the first embodiment, when the rotational member 2 continues to rotate clockwise, every time when the rotational member 2 is rotated 360 degrees, the magnetization direction of the magnetic member 15 is reversed, so that the coil 16 outputs the pulse accordingly. Similarly, when the rotational member 2 continues to be rotated counterclockwise, the coil 16 outputs the pulse accordingly every time when the rotational member 2 is rotated 360 degrees.

As described above, in the rotation detecting device 1 in the first embodiment, the magnets 3 and the magnets 4 are magnetized in the direction perpendicular to the rotational axis X of the rotational member 2, and have the alternately opposite magnetization directions. Further, the yoke 21 is provided for introducing the magnetic flux generated with the magnets 3 and the magnets 4 to pass through the magnetic member 15 in the extending direction thereof. Accordingly, even when the magnets 3 and the magnets 4 are arranged along the circumferential direction of the rotational member 2 with a small interval, it is possible to concentrate the magnetic flux of the magnets 3 and the magnets 4 to pass through the magnetic member 15 in the extending direction thereof. As a result, it is possible to securely reverse the magnetization direction of the magnetic member 15.

More specifically, in the first embodiment, the magnets 3 and the magnets 4 are magnetized in the direction perpendicular to the rotational axis X of the rotational member 2. Accordingly, when the magnets 3 and the magnets 4 are arranged adjacently along the circumferential direction of the rotational member 2, the N pole surface of each of the magnets 3 does not face the S pole surface of each of the magnets 4 each other. Accordingly, even when the magnets 3 and the magnets 4 are arranged along the circumferential direction of the rotational member 2 with a small interval, as opposed to the conventional configuration, it is possible to reduce the magnetic flux density of the magnetic flux passing through the shortest path on a straight line between the N pole surface of each of the magnets 3 and the S pole surface of each of the magnets 4.

Further, in the first embodiment, the yoke 21 is provided for introducing the magnetic flux generated with the magnets 3 and the magnets 4 to pass through the magnetic member 15 in the extending direction thereof. Accordingly, even when the magnets 3 and the magnets 4 are magnetized in the direction perpendicular to the rotational axis X of the rotational member 2, it is possible to concentrate the magnetic flux of the magnets 3 and the magnets 4 to pass through the magnetic member 15 in the extending direction thereof. As a result, it is possible to increase the magnetic flux density of the magnetic flux passing through the magnetic member 15 in the extending direction thereof.

Accordingly, even when the magnets 3 and the magnets 4 are arranged along the circumferential direction of the rotational member 2 with a small interval, as opposed to the conventional configuration, it is possible to securely reverse the magnetization direction of the magnetic member 15 with the magnetic field generated with the magnets 3 and the magnets 4. As a result, it is possible to reduce the size of the rotation detecting device 1, and to improve the rotation detection accuracy of the rotation detecting device 1.

Further, in the first embodiment, the yoke 21 is provided for introducing the magnetic flux generated with the magnets 3 and the magnets 4 to pass through the magnetic member 15 in the extending direction thereof. Accordingly, it is possible to make the configuration of the yoke 21 simple. Further, it is possible to increase the magnetic flux density of the magnetic flux passing through the magnetic member 15 in the extending direction thereof, and it is possible to securely reverse the magnetization direction of the magnetic member 15.

In the first embodiment, the magnets 3 and the magnets 4 have the alternately opposite magnetization directions in the circumferential direction of the rotational member 2. Further, the N pole surface of each of the magnets 3 and the S pole surface of each of the magnets 4 face inside the rotational path L. Still further, the magnetic member 15 is disposed inside the rotational path L. Accordingly, it is possible to make the magnetic flux pass through the simple path, i.e., passing from the N pole surface of each of the magnets 3 to the S pole surface of each of the magnets 4 through the magnetic member 15 in the extending direction thereof. As a result, it is possible to shorten the path of the magnetic flux. When the path of the magnetic flux is simple and short, it is possible to make the configuration of the yoke 21 simple. Further, when the path of the magnetic flux is simple and short, it is possible to easily introduce the magnetic flux into the path. As a result, it is possible to increase the magnetic flux density of the magnetic flux passing through the path.

Further, in the first embodiment, the yoke piece 22 and the yoke piece 23 include the protruding portion 28 and the protruding portion 29, respectively. Further, it is configured such that the distal end portions of the protruding portion 28 and the protruding portion 29 approach the magnets 3 and the magnets 4 passing through the magnetic field applying position C or the magnetic field applying position D, respectively. Accordingly, it is possible to minimize the distance between the magnets 3 or the magnets 4 and the protruding portion 28 or the protruding portion 29. As a result, it is possible to securely introduce the magnetic flux from the magnets 3 to the yoke piece 22 (or the yoke piece 23), and to securely introduce the magnetic flux from the yoke piece 23 (or the yoke piece 22) to the magnets 4. Accordingly, it is possible to create the path P11 of the magnetic flux shown in FIG. 5. As a result, it is possible to concentrate the magnetic flux generated with the magnets 3 and the magnets 4 to pass through the magnetic member 15 in the extending direction thereof.

Further, in the rotation detecting device 1 in the first embodiment, the base portion 24 of the yoke piece 22 is disposed away from the base portion 25 of the yoke piece 23. Further, the edge surface 24A of the base portion 24 is arranged in parallel to the edge surface 25A of the base portion 25. Accordingly, it is possible to create the path P11 shown in FIG. 6. As a result, it is possible to securely control the magnetic flux from one of the yoke piece 22 and the yoke piece 23 to the other of the yoke piece 22 and the yoke piece 23 to pass through the magnetic member 15 in the extending direction thereof.

Further, in the rotation detecting device 1 in the first embodiment, the base portion 24 and the base portion 25 are curved along the outer circumference of the coil 16 wound around the magnetic member 15. Accordingly, it is possible to increase the areas of the base portion 24 and the base portion 25 facing the magnetic member 15. As a result, it is possible to increase the magnetic flux density of the magnetic flux passing from one of the yoke piece 22 and the yoke piece 23 to the other of the yoke piece 22 and the yoke piece 23 through the magnetic member 15 in the extending direction thereof.

Further, in the rotation detecting device 1 in the first embodiment, the sidewall portion 26 and the sidewall portion 27 are formed on the yoke piece 22 and the yoke piece 23, respectively. Further, the distal end portions of the sidewall portion 26 and the sidewall portion 27 are arranged to get close to the magnetic member 15. Accordingly, it is possible to create the paths P12 and P13 shown in FIG. 5. As a result, it is possible to introduce the magnetic flux generated with the magnets 3 and the magnets 4 from the one end portion of the magnetic member 15 to the other end portion of the magnetic member 15 through the magnetic member 15. Accordingly, it is possible to increase the magnetic flux density of the magnetic flux passing through the magnetic member 15 in the extending direction thereof.

A modified example of the rotation detecting device 1 in the first embodiment will be explained next. In the first embodiment, the magnets 3 and the magnets 4 are arranged adjacently along the circumferential direction of the rotational member 2, and the yoke 21 is provided for introducing the magnetic flux generated with the magnets 3 and the magnets 4 to the magnetic member 15. The present invention is not limited to the configuration.

Figure 8:
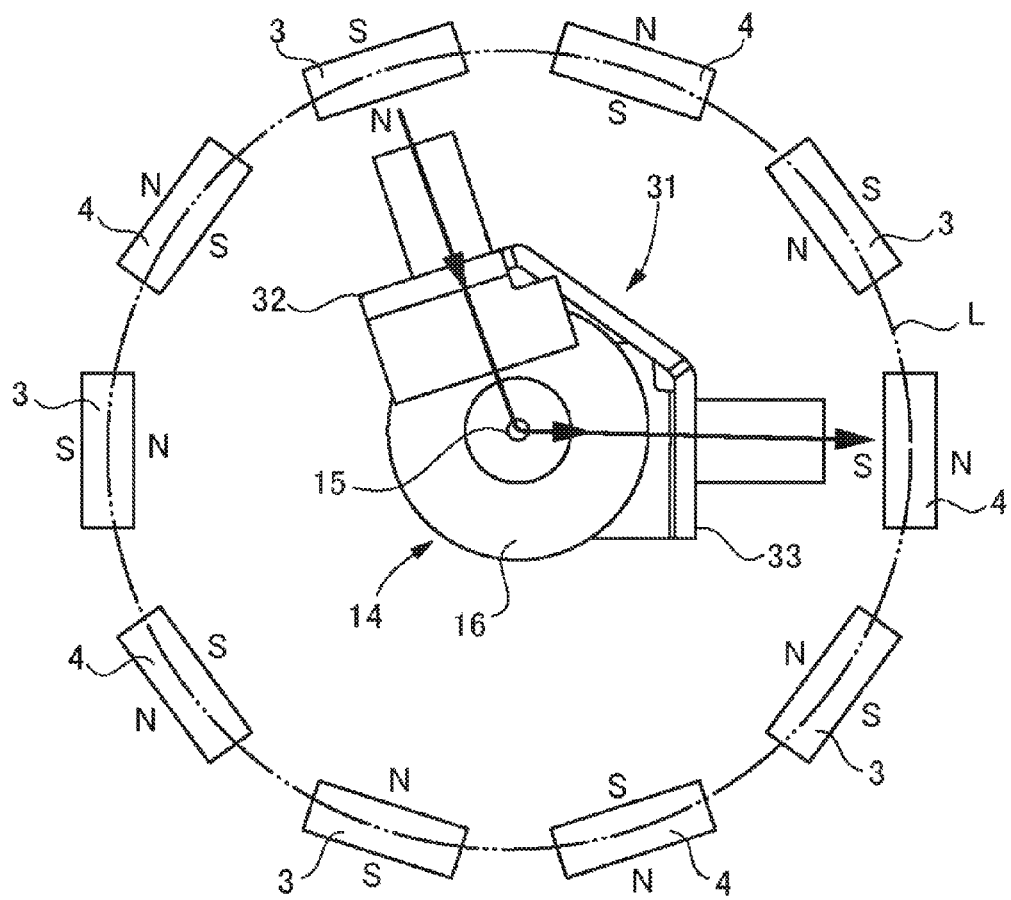
FIG. 8 is a schematic plan view showing a magnet and the detection member of the detection unit of the rotation detecting device according to a modified example of the first embodiment of the present invention.

FIG. 8 is a schematic plan view showing the magnets 3, the magnets 4, and the detection member 14 of the detection unit 7 of the rotation detecting device 1 according to the modified example of the first embodiment of the present invention.

As shown in FIG. 8, the detection member 14 includes a yoke 31 having yoke pieces 32 and 33. The yoke pieces 32 and 33 are situated to face one of the magnets 3 and one of the magnets 4, respectively. It should be noted that the one of the magnets 3 is not arranged adjacent to the one of the magnets 4, and there are two magnets 3 and 4 in between. In other words, the yoke 31 is provided for introducing the magnetic flux generated with the magnets 3 and the magnets 4 arranged not adjacently to the magnetic member 15.

Second Embodiment

Figure 9:
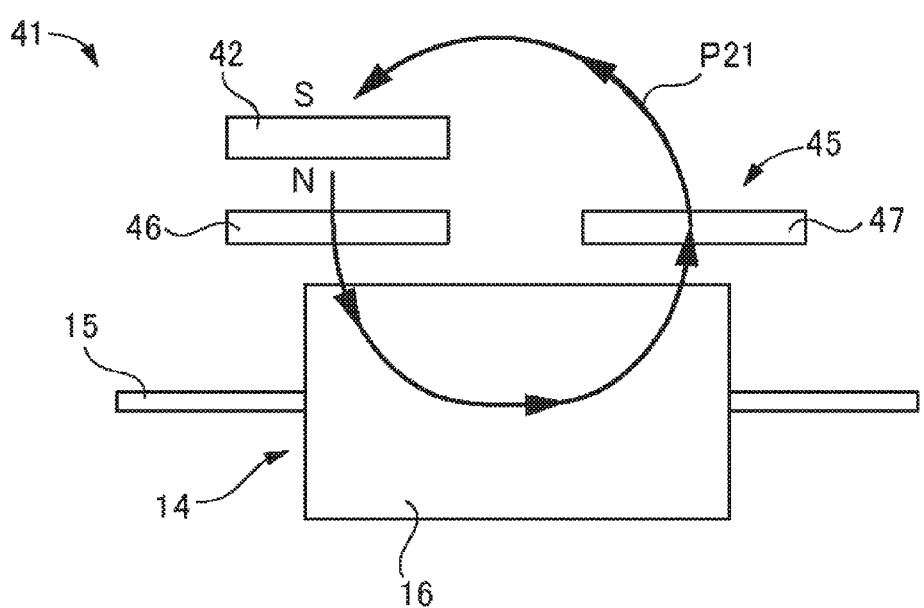
FIG. 9 is a schematic plan view showing a configuration of a rotation detecting device according to a second embodiment of the present invention.
Figure 10:
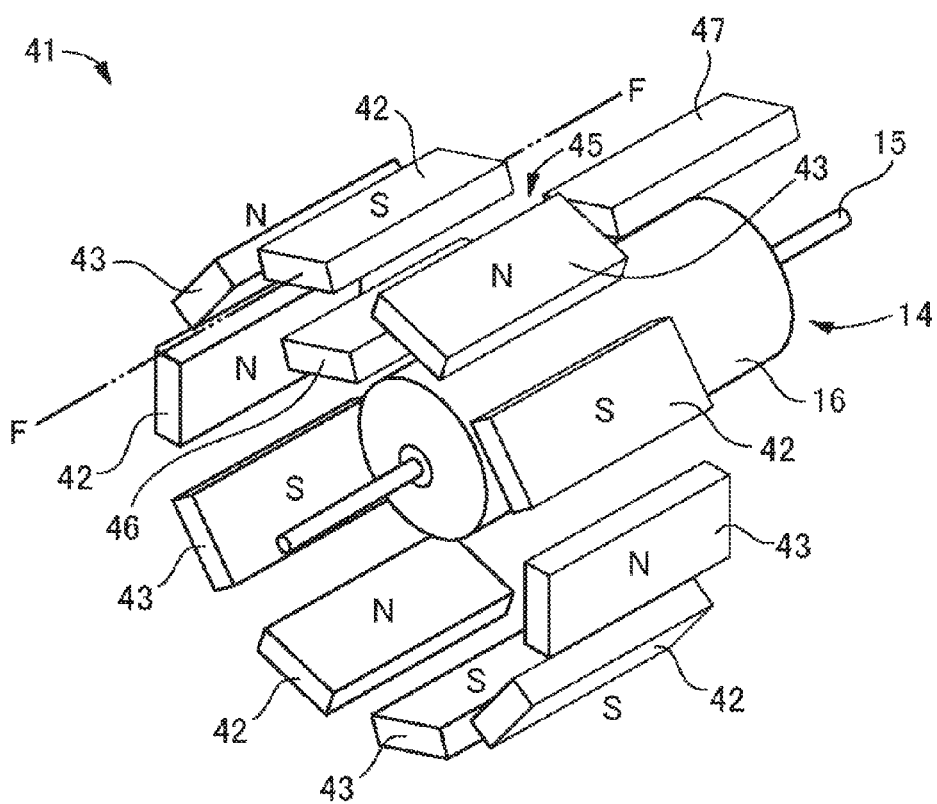
FIG. 10 is a schematic perspective view showing the configuration of the rotation detecting device according to the second embodiment of the present invention.

A second embodiment of the present invention will be explained next. FIG. 9 is a schematic plan view showing a configuration of a rotation detecting device 41 according to the second embodiment of the present invention. FIG. 10 is a schematic perspective view showing the configuration of the rotation detecting device 41 according to the second embodiment of the present invention.

As shown in FIGS. 9 and 10, the rotation detecting device 41 includes the detection member 14 and a yoke 45. The detection member 14 includes a plurality of magnets 42 and 43, the magnetic member 15, and the coil 16. The yoke 45 includes a pair of yoke pieces 46 and 47.

In the second embodiment, similar to the rotation detecting device 1 in the first embodiment, the magnets 42 and the magnets 43 are magnetized in a direction perpendicular to the rotational axis X of the rotational member 2. Further, the magnets 42 and the magnets 43 are arranged along the circumferential direction of the rotational member 2 such that magnetization directions thereof become opposite alternately. More specifically, each of the magnets 42 has an N pole on a surface thereof facing an inner circumference side and an S pole on a surface thereof facing an outer circumference side. Further, each of the magnets 43 has the S pole on a surface thereof facing the inner circumference side and the N pole on a surface thereof facing the outer circumference side.

In the second embodiment, the magnets 42 and the magnets 43 are situated near the one end portion of the magnetic member 15 in the extending direction thereof. It should be noted that there is only one magnetic field applying position on the rotational path of the magnets 42 and the magnets 43, which is represented with a phantom line F-F in FIG. 10. Also, it should be noted that FIG. 9 is the view showing one of the magnets 42 situated at the magnetic field applying position.

In the second embodiment, the yoke 45 includes a pair of the yoke pieces 46 and 47. The yoke piece 46 is situated at a location corresponding to the one end portion of the magnetic member 15, and the yoke piece 47 is situated at a location corresponding to the other end portion of the magnetic member 15 in the extending direction thereof. It should be noted that, when one of the magnets 42 or the magnets 43 is situated at the magnetic field applying position, the one of the magnets 42 or the magnets 43 approaches only the yoke piece 46.

In the second embodiment, in the rotation detecting device 41 having the configuration described above, when one of the magnets 42 passes through the magnetic field applying position as shown in FIG. 9, the yoke 45 introduces the magnetic flux generated with the one of the magnets 42. Accordingly, the magnetic flux passes through a path P21 passing from the N pole surface of the one of the magnets 42 to the S pole surface of the one of the magnets 42 through the magnetic member 15 in the extending direction thereof. It should be noted that, when one of the magnets 43 passes through the magnetic field applying position, the magnetic flux passes through a path in a direction opposite to that of the path P21.

In the second embodiment, in the rotation detecting device 41 having the configuration described above, it is possible to concentrate the magnetic flux generated with one of the magnets 42 or the magnets 43 passing through the magnetic field applying position, so that the magnetic flux passes through the magnetic member 15 in the extending direction thereof. Accordingly, even when the magnets 42 and the magnets 43 are arranged with a small interval in between, it is possible to securely reverse the magnetization direction of the magnetic member 15 with the magnetic field generated with the magnets 42 and the magnets 43. As a result, it is possible to reduce the size of the rotation detecting device 41, and to improve the rotation detection accuracy of the rotation detecting device 41.

Third Embodiment

Figure 11:
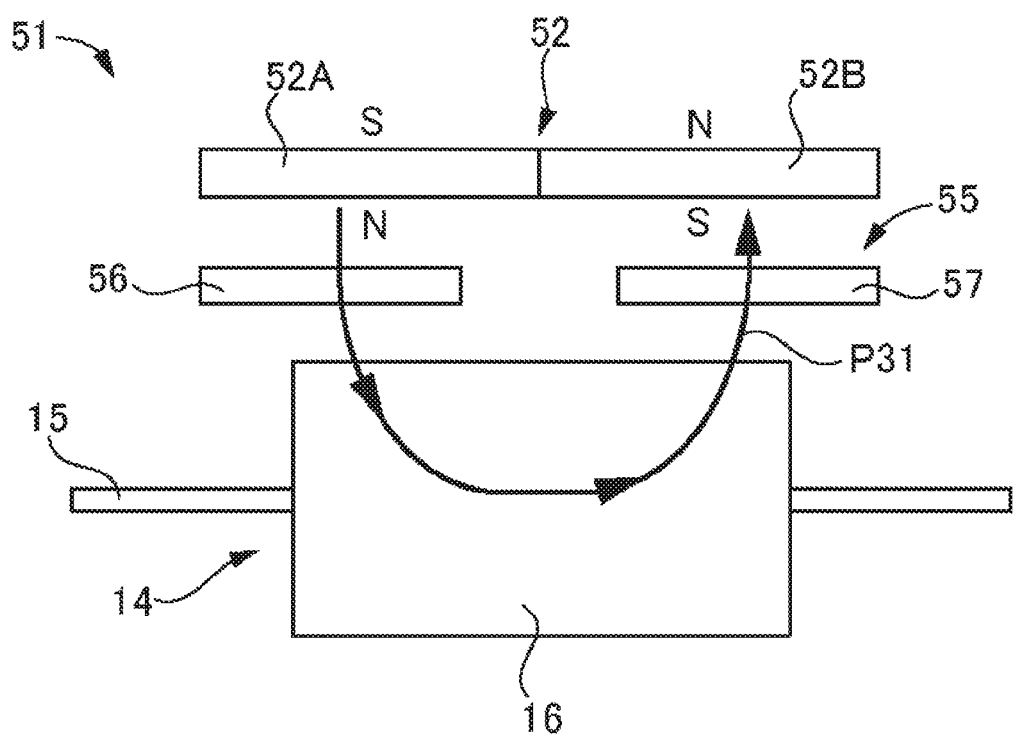
FIG. 11 is a schematic plan view showing a configuration of a rotation detecting device according to a third embodiment of the present invention.
Figure 12:
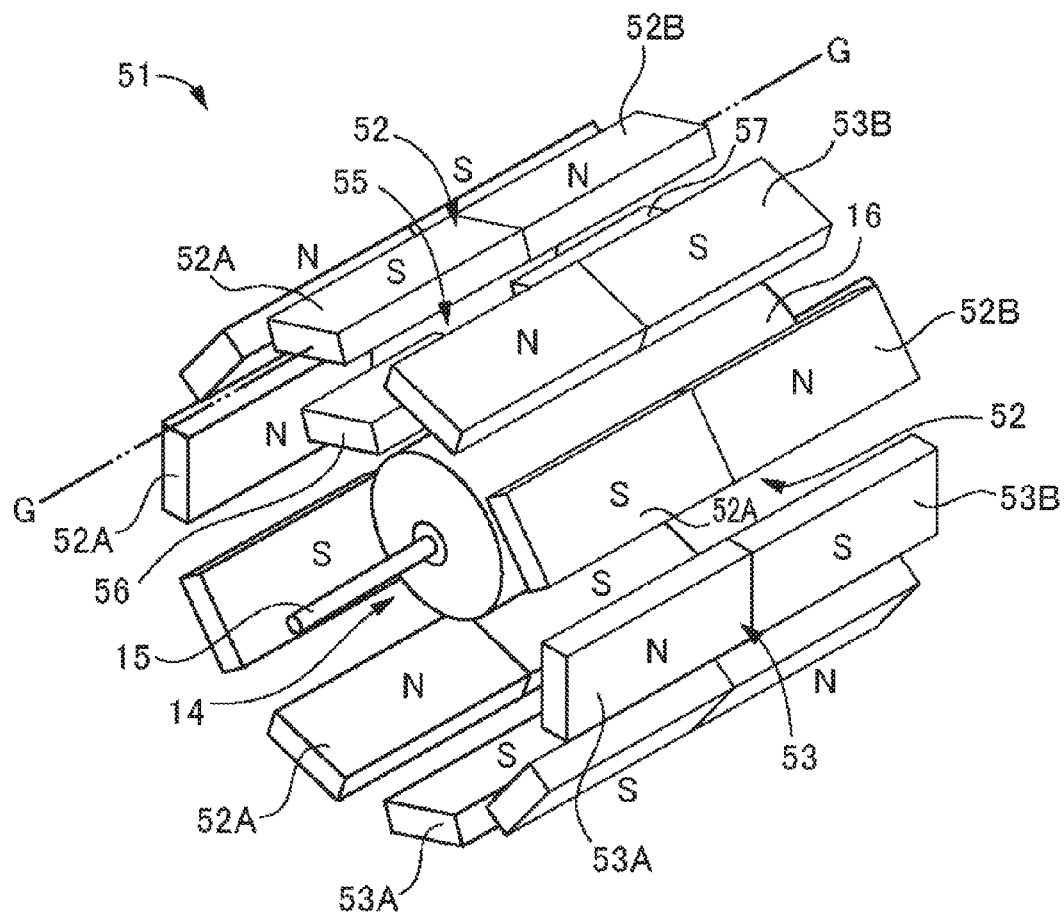
FIG. 12 is a schematic perspective view showing the configuration of the rotation detecting device according to the third embodiment of the present invention.
Figure 13:
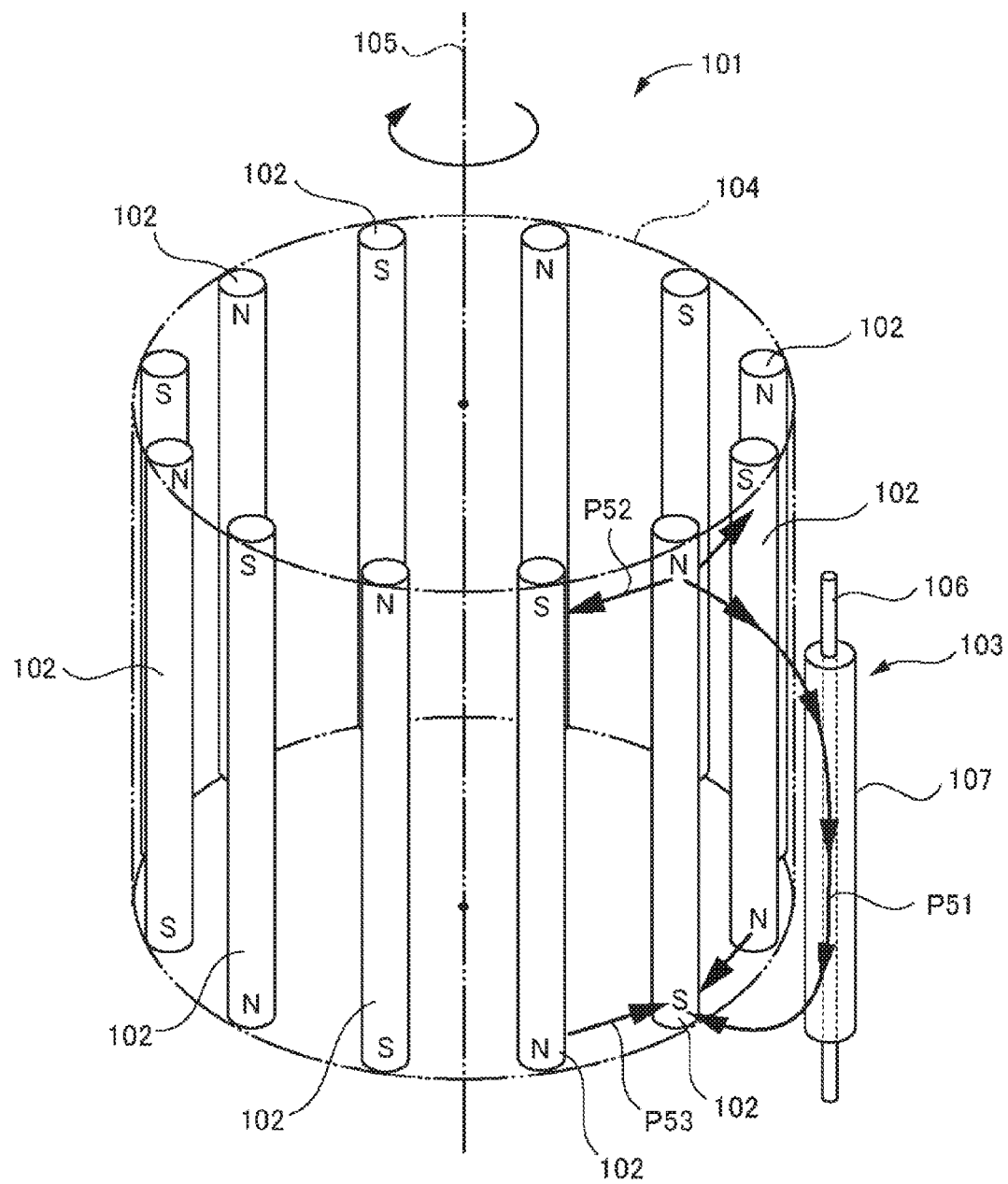
FIG. 13 is a schematic perspective view showing a configuration of a conventional rotation detecting device.

A third embodiment of the present invention will be explained next. FIG. 11 is a schematic plan view showing a configuration of a rotation detecting device 51 according to the third embodiment of the present invention. FIG. 12 is a schematic perspective view showing the configuration of the rotation detecting device 51 according to the third embodiment of the present invention.

As shown in FIGS. 11 and 12, the rotation detecting device 51 includes the detection member 14 and a yoke 55. The detection member 14 includes a plurality of magnets 52 and 53, the magnetic member 15, and the coil 16. The yoke 55 includes a pair of yoke pieces 56 and 57.

In the third embodiment, the magnets 52 and the magnets 53 are fixed to the rotational member 2. Different from the rotation detecting device 1 in the first embodiment, each of the magnets 52 includes a magnet piece 52A and a magnet piece 52B as a magnetic field generating piece. The magnet piece 52A and the magnet piece 52B are magnetized in a direction perpendicular to the rotational axis X of the rotational member 2. Further, the magnet piece 52A and the magnet piece 52B are arranged in a direction in parallel to the rotational axis X of the rotational member 2 such that magnetization directions thereof become opposite each other.

In the third embodiment, similar to the magnets 52, each of the magnets 53 includes a magnet piece 53A and a magnet piece 53B as a magnetic field generating piece. Further, the magnets 52 and the magnets 53 are arranged along the circumferential direction of the rotational member 2 such that magnetization directions of the magnetic piece 52A and the magnetic piece 53A become opposite alternately in the circumferential direction of the rotational member 2, and magnetization directions of the magnetic piece 52B and the magnetic piece 53B become opposite alternately in the circumferential direction of the rotational member 2.

More specifically, each of the magnetic piece 52A and the magnetic piece 53B has an N pole on a surface thereof facing an inner circumference side and an S pole on a surface thereof facing an outer circumference side. Further, each of the magnetic piece 52B and the magnetic piece 53A has the S pole on a surface thereof facing the inner circumference side and the N pole on a surface thereof facing the outer circumference side.

In the third embodiment, it should be noted that there is only one magnetic field applying position on the rotational path of the magnets 52 and the magnets 53, which is represented with a phantom line G-G in FIG. 12. Also, it should be noted that FIG. 11 is the view showing one of the magnets 52 situated at the magnetic field applying position.

In the third embodiment, the yoke 55 includes a pair of the yoke pieces 56 and 57. The yoke piece 56 is situated at a location corresponding to the one end portion of the magnetic member 15, and the yoke piece 57 is situated at a location corresponding to the other end portion of the magnetic member 15 in the extending direction thereof. It should be noted that, when one of the magnets 52 or the magnets 53 is situated at the magnetic field applying position, one of the magnetic piece 52A and the magnetic piece 53A approaches the yoke piece 56, and one of the magnetic piece 52B and the magnetic piece 53B approaches the yoke piece 57.

In the third embodiment, in the rotation detecting device 51 having the configuration described above, when one of the magnets 52 passes through the magnetic field applying position as shown in FIG. 11, the yoke 55 introduces the magnetic flux generated with the magnetic piece 52A and the magnetic piece 52B of the one of the magnets 52. Accordingly, the magnetic flux passes through a path P31 passing from the magnetic piece 52A of the one of the magnets 52 to the magnetic piece 52B of the one of the magnets 52 through the magnetic member 15 in the extending direction thereof.

Further, when one of the magnets 53 passes through the magnetic field applying position, the yoke 55 introduces the magnetic flux generated with the magnetic piece 53A and the magnetic piece 53B of the one of the magnets 52. Accordingly, the magnetic flux passes from the magnetic piece 53A of the one of the magnets 53 to the magnetic piece 53B of the one of the magnets 53 through the magnetic member 15 in the extending direction thereof.

In the third embodiment, in the rotation detecting device 51 having the configuration described above, it is possible to concentrate the magnetic flux generated with one of the magnets 52 or the magnets 53 passing through the magnetic field applying position, so that the magnetic flux passes through the magnetic member 15 in the extending direction thereof. Accordingly, even when the magnets 52 and the magnets 53 are arranged with a small interval in between, it is possible to securely reverse the magnetization direction of the magnetic member 15 with the magnetic field generated with the magnets 52 and the magnets 53. As a result, it is possible to reduce the size of the rotation detecting device 51, and to improve the rotation detection accuracy of the rotation detecting device 51.

The disclosure of Japanese Patent Application No. 2015-214436 filed on Oct. 30, 2015, is incorporated in the application by reference.

While the invention has been explained with reference to the specific embodiments of the invention, the explanation is illustrative and the invention is limited only by the appended claims.

What is claimed is:

1. A rotation detecting device configured to detect a rotation of a rotational member relative to a base member, comprising:
   a first magnetic field generating portion attached to the rotational member and arranged to align with a circumferential direction of the rotational member;
   a second magnetic field generating portion attached to the rotational member and arranged to align with the circumferential direction of the rotational member;
   a magnetic member attached to the base member and disposed inside a rotational path of the first magnetic field generating portion and the second magnetic field generating portion;
   a coil disposed around the magnetic member; and
   a magnetic field introducing portion attached to the base member and arranged between the rotational path of the first magnetic field generating portion and the second magnetic field generating portion and the magnetic member,
   wherein said first magnetic field generating portion has a first magnetic field in a first magnetic direction perpendicular to a rotational axis of the rotational member,
   said second magnetic field generating portion has a second magnetic field in a second magnetic direction perpendicular to the rotational axis of the rotational member,
   said second magnetic field generating portion is arranged so that the second magnetic direction is opposite to the first magnetic direction,
   said magnetic member is extended in parallel to the rotational axis of the rotational member,
   said magnetic member has a third magnetic field in a third magnetic direction in parallel to the rotational axis of the rotational member,
   said magnetic member is configured to have the third magnetic field in the third magnetic direction that can be reversed by the first magnetic field and the second magnetic field, and
   said magnetic field introducing portion is arranged to introduce a magnetic flux of one of the first magnetic field generating portion and the second magnetic field generating portion to pass through the magnetic member in parallel to the rotational axis of the rotational member when the one of the first magnetic field generating portion and the second magnetic field generating portion passes through a specific location on the rotational path thereof.

2. The rotation detecting device according to claim 1, wherein said magnetic field introducing portion is arranged to introduce the magnetic flux of the one of the first magnetic field generating portion and the second magnetic field generating portion to pass through in parallel to the rotational axis of the rotational member when the one of the first magnetic field generating portion and the second magnetic field generating portion passes through a first location on the rotational path thereof and the other one of the first magnetic field generating portion and the second magnetic field generating portion concurrently passes through a second location on the rotational path thereof.

3. The rotation detecting device according to claim 1, wherein said magnetic field introducing portion includes a first yoke piece and a second yoke piece, said first yoke piece is arranged to face the second yoke piece and be away from the second yoke piece in parallel to the rotational axis of the rotational member, said first yoke piece includes a first protruding portion protruding toward the rotational path of the first magnetic field generating portion and the second magnetic field generating portion, said second yoke piece includes a second protruding portion protruding toward the rotational path of the first magnetic field generating portion and the second magnetic field generating portion, and said first protruding portion and said second protruding portion are arranged so that the first magnetic field generating portion gets close to the first protruding portion when the second magnetic field generating portion gets close to the second protruding portion.

4. The rotation detecting device according to claim 3, wherein said first yoke piece is situated at a location corresponding to one end portion of the magnetic member, and said second yoke piece is situated at a location corresponding to the other end portion of the magnetic member.

5. The rotation detecting device according to claim 3, wherein said first yoke piece is formed of a first plate member curved so that the first plate member is situated along an outer circumference of the coil, and said second yoke piece is formed of a second plate member curved so that the second plate member is situated along the outer circumference of the coil.

6. The rotation detecting device according to claim 3, wherein said first yoke piece is formed of a plate member having a curved portion and a flat portion extending toward the magnetic member, and said second yoke piece is formed of a plate member having a curved portion and a flat portion extending toward the magnetic member.

7. The rotation detecting device according to claim 1, wherein said magnetic field introducing portion is arranged to introduce the magnetic flux passing from one surface of the one of the first magnetic field generating portion and the second magnetic field generating portion to another surface of the one of the first magnetic field generating portion and the second magnetic field generating portion in a radius direction of the rotational member.

8. The rotation detecting device according to claim 1, wherein said first magnetic field generating portion is arranged in parallel to the rotational axis of the rotational member, said second magnetic field generating portion is arranged in parallel to the rotational axis of the rotational member, and said second magnetic field generating portion is arranged so that the second magnetic direction is opposite to the first magnetic direction in the circumferential direction of the rotational member.

9. The rotation detecting device according to claim 1, wherein said magnetic member is formed of a large Barkhausen element.

* * * * *